(12) United States Patent
Krimmel

(10) Patent No.: US 8,213,796 B2
(45) Date of Patent: Jul. 3, 2012

(54) METHOD AS A PRE-CONDITION FOR A GAIN CONTROL, OPTICAL ACCESS NETWORK, CENTRAL STATION AND TERMINAL

(75) Inventor: Heinz-Georg Krimmel, Korntal-Munchingen (DE)

(73) Assignee: Alcatel Lucent, Paris (FR)

( * ) Notice: Subject to any disclaimer, the term of this patent is extended or adjusted under 35 U.S.C. 154(b) by 1189 days.

(21) Appl. No.: 11/751,357

(22) Filed: May 21, 2007

(65) Prior Publication Data

US 2007/0280683 A1 Dec. 6, 2007

(30) Foreign Application Priority Data

May 23, 2006 (EP) .................................... 06290841

(51) Int. Cl.
*H04J 14/00* (2006.01)
(52) U.S. Cl. ................. 398/66; 398/47; 398/68
(58) Field of Classification Search ............. 398/32–34, 398/47–48, 51–53, 66–69
See application file for complete search history.

(56) References Cited

U.S. PATENT DOCUMENTS

| | | | | |
|---|---|---|---|---|
| 6,262,997 | B1 * | 7/2001 | Quayle ......................... | 370/503 |
| 2003/0067873 | A1 * | 4/2003 | Fuhrmann et al. ............. | 370/230 |
| 2004/0196534 | A1 | 10/2004 | Obeda et al. | |
| 2004/0247224 | A1 * | 12/2004 | Littlewood et al. ............... | 385/7 |
| 2005/0244096 | A1 * | 11/2005 | Jeffers et al. ..................... | 385/15 |
| 2006/0251014 | A1 * | 11/2006 | Castor et al. ................... | 370/329 |
| 2008/0232819 | A1 * | 9/2008 | Mukai ........................... | 398/168 |

FOREIGN PATENT DOCUMENTS

EP 0437072 A1 7/1991

OTHER PUBLICATIONS

J. Burgmeier, et al. "A Black Box Model of EDFA's Operating in WDM Systems" Journal of Lightwave Technology, vol. 16, No. 7, Jul. 1998 IEEE, pp. 1271-1275.
Cechan Tian, et al. "Analysis and Control of Transient Dynamics of EDFA Pumped by 1480- and 980-nm Lasers" Journal of Lightwave Technology, vol. 21, No. 8, Aug. 2003 IEEE, pp. 1728-1734.
Miroslav Karasek, et al. "Output Power Excursions in a Cascade of EDFAs Fed by Multichannel Burst-Mode Packet Traffic: Experimentation and Modeling" Journal of Lightwave Technology, vol. 19, No. 7, Jul. 2001 IEEE, pp. 933-940.

* cited by examiner

*Primary Examiner* — Dzung Tran
(74) *Attorney, Agent, or Firm* — Harness, Dickey & Pierce, P.L.C.

(57) ABSTRACT

The invention concerns a method as a pre-condition for a gain control of an optical amplifier that amplifies a whole signal out of a multiple of optical signals and where each of these signals includes regular gaps, in which these optical signals are synchronized with respect to each other such that the gaps coincide, as well as a tree-shaped optical access network, a central station, and a terminal.

14 Claims, 1 Drawing Sheet

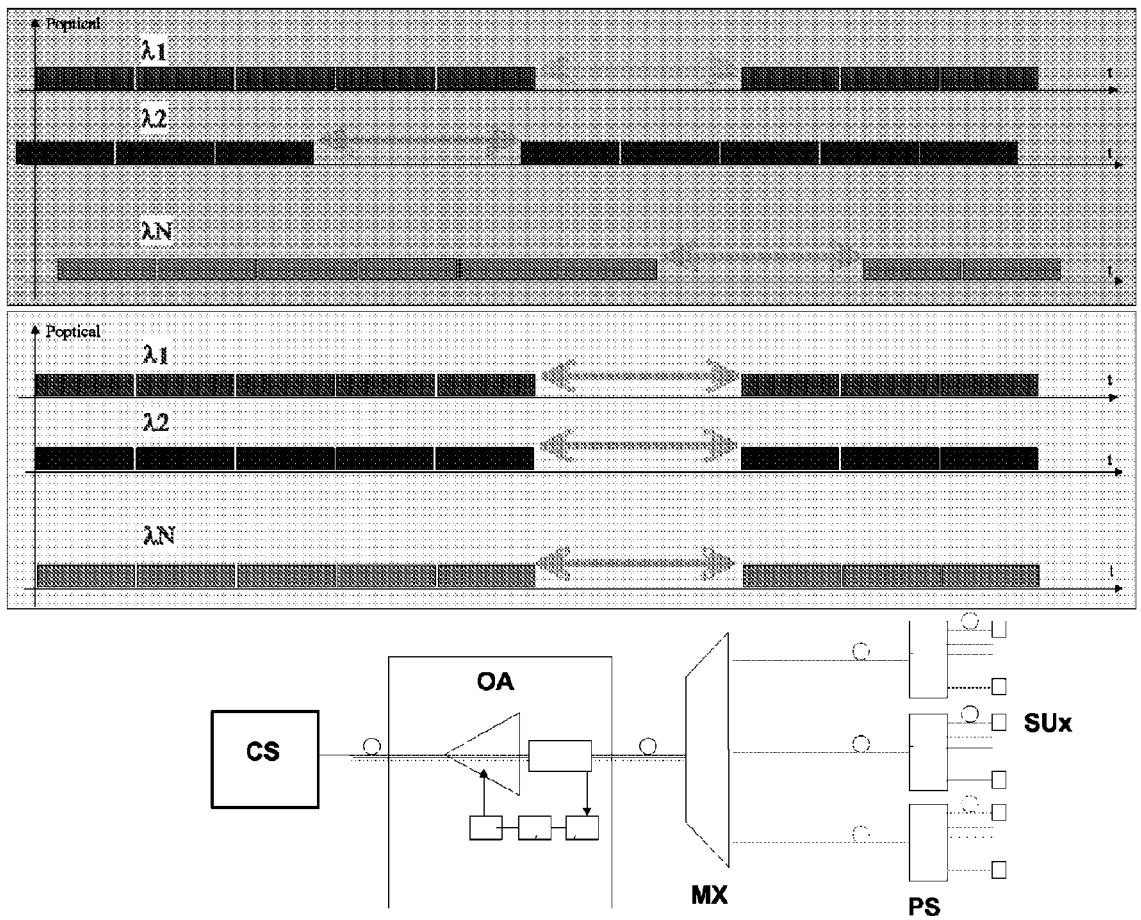

METHOD AS A PRE-CONDITION FOR A GAIN CONTROL, OPTICAL ACCESS NETWORK, CENTRAL STATION AND TERMINAL

BACKGROUND OF THE INVENTION

The invention is based on a priority application EP 06290841.3 which is hereby incorporated by reference.

The invention relates to a method as a pre-condition for a gain control of an optical amplifier that amplifies a whole signal out of a multiple of optical signals and where each of these signals includes regular gaps.

The invention further relates to a tree-shaped optical access network with a central station and at least one optical access line connected thereto for a whole signal out of a multiple of optical signals destined for incoming at the central station, where each of these signals includes regular gaps and comes from different terminals and with a repeater looped into the optical access line and including an optical amplifier for the whole signal.

The invention further relates to a central station and to a terminal.

Such a tree-shaped optical access network is shown in FIG. 1 of "Fast Switching and Gain Control of Optical Repeater Units for Burst Mode Upstream Transmission Over Super-PONs" by J. Zhou et al. in Proceedings of the SPIE—The International Society for Optical Engineering (1996), vol. 2893, pp. 19-24.

Though such access networks include at least one optical amplifier, that is an active element, these networks commonly are called PONs, that is Passive Optical Networks.

At the branched ends of such networks a multiple of terminals is located that more or less independently send their information to the central station. When they do this with different wavelengths, they are at first glance really independent from one another.

Such terminals do not work in a continuous, synchronous way as with former transmission techniques, but they work in an asynchronous, bursty way. One aspect thereof is that the amplitude of the combined signals is not constant.

The document by J. Zhou et al. cited at the beginning works with Semiconductor Optical Amplifiers, SOAs, whose gains are largely insensitive to changing power levels below saturation. But another type of optical amplifiers, the Erbium Doped Fiber Amplifiers, EDFAs, is sensitive thereto. This means in particular, that varying signal strength on one wavelength can alter the gain experienced by a signal on a second wavelength. Fortunately such amplifiers have other characteristics that make them preferable anyway. That is why one has to cope with the unwanted characteristics mentioned first.

One aspect of the unwanted characteristics is a certain amount of gain coupling between the different single signals out of the combined whole signal. This cross gain effect mainly is the result of some kind of memory effect for slow signal components offered by those amplifiers.

What especially attracts attention is the situation of inserting a new terminal to the access network or restoring the network after an interruption. In such situation inter alia the precise gain control of the amplifier(s) is important to allow for the setting of a reliable detection threshold. Here cross gain effects are very much disturbing.

SUMMARY OF THE INVENTION

Here the invention finds a remedy by a method as a pre-condition for a gain control of an optical amplifier that amplifies a whole signal out of a multiple of optical signals and where each of these signals includes regular gaps, where these optical signals are synchronized with respect to each other such that the gaps coincide.

The problem further is overcome by a tree-shaped optical access network with a central station and at least one optical access line connected thereto for a whole signal out of a multiple of optical signals destined for incoming at the central station, where each of these signals includes regular gaps and comes from different terminals and with a repeater looped into the optical access line and including an optical amplifier for the whole signal, whereby the central station is build such that it grants the terminals for sending and that such grants occur such that the gaps of all signals coincide on the optical access line.

The problem further is overcome by a central station for a tree-shaped optical access network with a central station and at least one optical access line connected thereto for a whole signal out of a multiple of optical signals destined for incoming at the central station, where each of these signals includes regular gaps and comes from different terminals and with a repeater looped into the optical access line and including an optical amplifier for the whole signal, whereby the central station is build such that it grants the terminals for sending and that such grants occur such that the gaps of all signals coincide on the optical access line.

The problem further is overcome by a terminal for a tree-shaped optical access network with a central station and at least one optical access line connected thereto for a whole signal out of a multiple of optical signals destined for incoming at the central station, where each of these signals includes regular gaps and comes from different terminals and with a repeater looped into the optical access line and including an optical amplifier for the whole signal, wherein the terminal is build such that it observes in its emission silent periods such that at the optical amplifier the silent periods occur at given times.

With this time windows are created with well-defined characteristics during which for sure there is no cross gain effect from other wavelengths. Of course such solution also is applicable when there is no dependency from cross gain effects or where for other reasons one wants to have well-defined characteristics.

Further embodiments of the invention are to be found in the subclaims and the following description.

BRIEF DESCRIPTION OF THE DRAWINGS

In the following the invention will be described with the aid of the accompanying drawings:

FIG. 1 shows a tree-shaped optical access network according to the invention and above it the behavior with and without the method according to the invention.

On the basis of FIG. 1 this invention now will be described.

DETAILED DESCRIPTION OF THE DRAWINGS

FIG. 1 shows at the bottom a tree-shaped optical access network with a central station CS, an optical amplifier OA, a multiplexer MX for combining the signals with different wavelengths, a couple of power splitters PS, and a multiple of subscriber units or terminals, one of these being denoted as SUx.

First the known operation of such network will be described:

Each power splitter PS together with the subscriber units SUx connected thereto builds one group working with one and the same operating wavelength. Insofar we only regard the upstream direction from the subscriber units to the central station. Each such group works with a wavelength different from the wavelengths of the other groups. Within one group the subscriber units' operation is regulated by a scheduler being part of the central station. Each scheduler grants time slots to the different subscriber units assigned to it, such that on the one hand there is no overlap and on the other hand no unnecessary gap on either of the wavelengths.

In order to cope with the already mentioned situation of inserting a new subscriber unit to the access network or restoring the network after an interruption it is necessary to reserve a certain gap where a subscriber unit may try to register without disturbing the others.

Between the central station CS and the multiplexer MX we thus have the situation illustrated at the top of FIG. 1 with the double arrows representing those gaps.

As the schedulers are working independent from one another, the gaps are arbitrary with respect to one another.

Here the invention suggests to align those gaps as illustrated in the middle of FIG. 1, creating a time interval where all wavelengths are silent.

This can easily be achieved by a cooperation of the different schedulers. Such cooperation can be restricted to the alignment of the delays on the respective access line in order to ensure the gap being located at the foreseen time period. The measuring and the taking into account of delays for other reasons anyway are being done.

When such network does not have centralized schedulers or the like, but works on a decentralized basis, than the terminals are to ensure the common silent period. This for example can be done by adjusting the gaps at the position of the optical amplifier to prescribed points in time. Here too the delays have to be taken into account.

By this measure the anyway necessary transmission free time interval is the basis of a situation free of cross gain effects and with zero signal dynamics.

The invention claimed is:

1. A method of synchronizing subscriber signals in an optical access network, the method comprising:
   issuing, with a scheduler to a subscriber, a transmission grant to transmit a subscriber signal, the subscriber signal being an optical signal, the transmission grant instructing the subscriber to transmit the subscriber signal such that the transmission gap in the transmitted subscriber signal arrives at a receiver during a same time interval with each other transmission gap in each other transmitted subscriber signal from a plurality of the subscribers; and
   receiving, from the plurality of subscribers, the plurality of subscriber signals having the synchronized transmission gap in each received subscriber signal.

2. The method of claim 1, further comprising:
   combining the plurality of subscriber signals having the synchronized transmission gap into a single whole signal.

3. The method of claim 2, further comprising:
   amplifying the single whole signal including the combined subscriber signals having the synchronized transmission gap.

4. The method of claim 3, further comprising:
   transmitting the amplified single whole signal including the combined subscriber signals having the synchronized transmission gap to a central station.

5. The method of claim 4, further comprising:
   receiving, at the central station, a registration from one of the subscribers during the synchronized transmission gap.

6. The method of claim 1, wherein the plurality of subscriber signals each has a different wavelength from each other subscriber signal.

7. A method of synchronizing subscriber signals in an optical access network, the method comprising:
   transmitting a subscriber signal from an independent subscriber, the subscriber signal being an optical signal, the subscriber signal being transmitted in a synchronous manner such that each transmission gap in the transmitted subscriber signal arrives at a receiver during a same time interval with each other transmission gap in each other transmitted subscriber signal.

8. The method of claim 7, the method further comprising:
   receiving, from a scheduler, a transmission grant to transmit the associated subscriber signal such that each transmission gap in each transmitted subscriber signal arrives at a receiver during a same time interval with each other transmission gap in each other transmitted subscriber signal.

9. An optical access network comprising:
   an independent subscriber configured to,
      generate and transmit a subscriber signal to a receiver, the subscriber signal being an optical signal, the subscriber signal being transmitted in a synchronous manner such that each transmission gap in the transmitted subscriber signal arrives at a receiver during a same time interval with each other transmission gap in each other transmitted subscriber signal.

10. The optical access network of claim 9, wherein the independent subscriber is further configured to generate and transmit a registration to a central station during the synchronized transmission gap.

11. The optical access network of claim 9, wherein the independent subscriber is further configured to transmit the subscriber signal having the synchronized transmission gap based on a transmission grant issued by a scheduler.

12. An optical access network comprising:
   a scheduler configured to control a plurality of independent subscribers to transmit a plurality of subscriber signals in a synchronized manner such that each transmission gap in each transmitted subscriber signal arrives at a receiver during a same time interval with each other transmission gap in each other transmitted subscriber signal, each of the independent subscribers generating one of the subscriber signals, the subscriber signals being optical signals; and
   an amplifier configured to amplify a single combined signal including the subscriber signals having the synchronized transmission gap.

13. The optical access network of claim 12, further comprising:
   a central station configured to receive the amplified single combined signal including the subscriber signals having the synchronized transmission gap.

14. The optical access network of claim 13, wherein the central station is further configured to receive a registration from one of the independent subscribers during the synchronized transmission gap.

* * * * *